Patented May 27, 1947

2,421,082

UNITED STATES PATENT OFFICE 2,421,082

LUBRICANT

Mathias Pier, Heidelberg, and Friedrich Christmann, Ludwigshafen-on-the-Rhine, Germany; vested in the Attorney General of the United States No Drawing. Application March 8, 1941, Serial No. 382,394. In Germany July 5, 1937

6 Claims. (Cl. 252—59)

The present invention relates to improved lubricants, more particularly lubricating oils.

We have found that the properties of lubricants, and especially of mineral lubricating oils, are much improved by an addition of high molecular weight polymerization products obtained by polymerizing compounds having a polymerizable double linkage which, when polymerized by themselves with the aid of acid-reacting inorganic halides or substances having large surfaces, yield products of high molecular weight, i. e. of a molecular weight above 1000, and which preferably contain an aromatic group, in admixture with cracking or dehydrogenation products of hydrocarbons or the hydrocarbons obtained in the synthesis of benzine from carbon monoxide and hydrogen, if they contain unsaturated constituents, the polymerization being effected with the aid of acid-reacting halides or substances having large surfaces.

As compounds to be used in the production of the said polymerization products, which have a polymerizable double linkage and which when polymerized alone by means of acid-reacting inorganic halides or substances having large surfaces yield high molecular weight products, use is preferably made of styrene, alkylstyrenes, cumarone or indene, either alone or in admixture with other compounds capable of yielding high molecular weight products, as for example vinyl ethers, as for example vinyl ethyl, vinyl isobutyl or vinyl oleyl ether, isobutylene, monovinylacetylene or divinylacetylene; the latter group of substances may also be used alone, though generally with less good results.

Suitable cracking or dehydrogenation products of hydrocarbons are in particular those which are obtained from hydrocarbons rich in hydrogen which preferably contain more than 13.5 grams, in particular more than 15 grams, of hydrogen for each 100 grams of carbon, or from paraffin base mineral oils or their fractions. Cracking or dehydrogenation products of the substances obtainable in the synthesis of benzine from carbon monoxide and hydrogen with or without pressure or the said substances themselves if they contain unsaturated constituents are also suitable. The products obtainable by cracking the said substances above 350° C., if desired in the presence of catalysts, as for example alumina or bleaching earths, which may also be treated with acids, as for instance hydrochloric acid, or in particular by cracking at temperatures of from 450° to 800° C. are most suitable. In the latter case, the cracking products contain large amounts of constituents unsaturated more than once.

The dehydrogenation products may also be obtained in known manner, as for example by leading the initial materials through hot tubes or over known dehydrogenation catalysts, by treatment of saturated hydrocarbons with halogen and then splitting off hydrogen halide or by treatment with oxygen or sulphur, if desired in the presence of bleaching earths, boric acid or oxalic acid.

The production of the polymerization products is preferably carried out with the aid of inorganic acid-reacting halides, as examples of which there may be mentioned aluminum chloride, iron chloride, zinc chloride, titanium chloride and in particular boron fluoride and also its addition compounds with alcohols, ethers, acids or water. The production of the polymerization products may also be effected by means of substances having large surfaces, among which in particular those of an acid nature, as for example silica gel or the bleaching earths known under the names "Terrana," "Florida earths" and "Fuller's earth" are suitable. Their action is frequently enhanced by additions of acids, as for instance boric or phosphoric acid, or acid salts.

The polymerization of the mixtures of the said substances may be carried out at ordinary, increased or reduced temperature, as for example below 0° C. or better at from 10° to 70° below zero C. or still lower.

Solvents may also be used during the polymerization, as for example hydrocarbons, such as benzene or benzine, or halogen hydrocarbons, such as carbon tetrachloride, chloroform, ethylene chloride, or also dichlordiethylether or esters or mixtures of such solvents.

The polymerization products obtained are soluble in mineral oils and are valuable agents for improving the viscosity and viscosity index thereof. Whereas substances which improve the viscosity of oils are frequently very sensitive to temperature and lose their action at about 300° C., the said polymerization products are stable to temperature and retain their improving action on lubricating oils even when the latter are heated to high temperatures for long periods. The polymerization products are also very resistant to high pressures, such as occur for example in modern gears or bearings, and form very stable lubricant films. They may be added not only to lubricating oils, but are also suitable as additions to gear oils and greases.

The following examples will further illustrate how this invention may be carried out in practice but the invention is not restricted to these examples. The parts are by weight.

*Example 1*

Gaseous boron fluoride is led at ordinary temperature into a mixture of 70 parts of styrene and 130 parts of a liquid hydrocarbon mixture containing unsaturated hydrocarbons which has been obtained by cracking paraffin wax at 500° C. The mixture thus becomes heated to about 60° C.

The mixture is kept at the said temperature for 10 hours. The polymerization product obtained is heated to 250° C. to remove boron fluoride and then distilled in vacuo. As a distillate there are obtained 10 parts of middle oil and 50 parts of spindle oil. There remain 126 parts of residue in the form of a tough, plastic mass having a Conradson test of 0.16 per cent. This mass is very suitable as an addition to lubricating oil. For example, an addition of 5 per cent thereof to a machine oil having a viscosity of 6.5° Engler at 50° C. and a viscosity index of 5 increases the viscosity of the oil to 8.6° Engler at 50° C. and the viscosity index to 49.

*Example 2*

A mixture of 50 parts of isobutylene, 50 parts of styrene and 55 parts of a liquid hydrocarbon product obtained by cracking paraffin wax at 500° C. is cooled down to 5° below zero C. and polymerized by leading in gaseous boron fluoride. The temperature rises slowly to 50° C. during the polymerization. A highly viscous oil having a viscosity of 80° Engler at 100° C. is thus obtained with a yield of about 92 per cent. It is suitable for improving the viscosity of hydrocarbon oils, especially lubricating oils, and this property is not destroyed even when heating the oils containing it at about 300° C. For example, by an addition of 5 per cent of the product to a lubricating oil, the viscosity index of the latter is increased from 50 to 80.

*Example 3*

Boron fluoride is passed at ordinary room temperature into a mixture of 45 parts of styrene and 55 parts of a normally liquid hydrocarbon product obtained by cracking paraffin wax and containing between 60 and 70 per cent of olefines. The temperature of the mass is slowly increased by heating to 50° C. where it is maintained for five hours, whereupon the mass is heated for a further five hours at 65° C. Thereafter the mass is heated to 200° C. in order to drive off the boron fluoride and then subjected to distillation in vacuo whereby as first runnings 5 per cent (calculated with reference to the initial mixture of hydrocarbons) of a middle oil boiling from 200° to 300° C. and 35 per cent of a spindle oil boiling from 300° to about 380° C. are obtained. The distillation residue is a highly viscous mass which when added in an amount of 3 per cent to a machine oil having a viscosity of 6° E. at 50° C. yields an oil having a viscosity of 8.3° E. at 50° C.

Similar results are obtained when employing, instead of a cracking product from paraffin wax, a liquid reduction product of carbon monoxide which contains substantial amounts of olefines or which has been rendered unsaturated by dehydrogenation or cracking, or also a dehydrogenation product of a paraffinic benzine.

*Example 4*

40 parts of styrene, 30 parts of isobutylene and 30 parts of a liquid hydrocarbon product obtained by cracking paraffin wax and containing 70 per cent of olefines are dissolved in an equal amount of ethylene chloride whereupon about 3 per cent by weight of boron fluoride is passed in while cooling with ice. The temperature of the mass slowly increases to 60° C. In order to remove the boron fluoride and the ethylene chloride the mass is heated to 200° C. and thereafter subjected to distillation in order to distil off small amounts of oils with medium boiling point range up to about 380° C. The distillation residue is a highly viscous product which when added in an amount of 5 per cent to a machine oil having a viscosity of 5° E. at 50° C. increases the viscosity of the oil to 7.8° E. at 50° C.

This application is a continuation in part of our copending application for Patent Serial No. 217,280, filed July 2, 1938.

What we claim is:

1. A composition of matter essentially comprising a mineral oil lubricant and a viscosity increasing agent soluble in said mineral oil and comprising a polymerization product obtainable by interpolymerizing a compound which is polymerizable by reason of having a double carbon linkage and which, when polymerized by itself by means of an acid-reacting inorganic halide, yields a product of molecular weight above 1000, with a hydrocarbon mixture containing unsaturated constituents and selected from the group consisting of cracking and dehydrogenation products of hydrocarbons and hydrocarbons obtained in the synthesis of benzine from carbon monoxide and hydrogen.

2. A composition of matter essentially comprising a mineral oil lubricant and a viscosity increasing agent soluble in said mineral oil and comprising a polymerization product obtainable by interpolymerizing a compound containing an aromatic group which is polymerizable by reason of having a double carbon linkage and which, when polymerized by itself by means of an acid-reacting inorganic halide, yields a product of molecular weight above 1000, with a hydrocarbon mixture containing unsaturated constituents and selected from the group consisting of cracking and dehydrogenation products of hydrocarbons and hydrocarbons obtained in the synthesis of benzine from carbon monoxide and hydrogen.

3. A composition of matter essentially comprising a mineral oil lubricant and a viscosity increasing agent soluble in said mineral oil and comprising a polymerization product obtainable by interpolymerizing a compound containing an aromatic group which is polymerizable by reason of having a double carbon linkage and which, when polymerized by itself by means of an acid-reacting inorganic halide yields a product of molecular weight above 1000, together with a further polymerizable compound having an unsaturated carbon linkage with a hydrocarbon mixture containing unsaturated constituents and selected from the group consisting of cracking and dehydrogenation products of hydrocarbons and hydrocarbons obtained in the synthesis of benzine from carbon monoxide and hydrogen.

4. A composition of matter essentially comprising a mineral oil lubricant and a viscosity increasing agent soluble in said mineral oil and comprising a polymerization product obtainable by interpolymerizing a compound which is polymerizable by reason of having a double carbon linkage and which, when polymerized by itself by means of an acid-reacting inorganic halide, yields a product of molecular weight above 1000, with a hydrocarbon mixture containing unsaturated constituents and obtained by dehydrogenating hydrocarbons containing more than 13.5 grams of hydrogen.

5. A composition of matter essentially comprising a mineral oil lubricant and a viscosity increasing agent soluble in said mineral oil and comprising a polymerization product obtainable by interpolymerizing by means of boron fluoride

Certificate of Correction

Patent No. 2,421,082.  May 27, 1947.

MATHIAS PIER ET AL.

It is hereby certified that error appears in the printed specification of the above numbered patent requiring correction as follows: Column 4, line 70, claim 4, after "hydrogen" and before the period insert *for each 100 grams of carbon*; and that the said Letters Patent should be read with this correction therein that the same may conform to the record of the case in the Patent Office.

Signed and sealed this 12th day of August, A. D. 1947.

[SEAL]

LESLIE FRAZER,
*First Assistant Commissioner of Patents.*